United States Patent [19]
Chen

[11] Patent Number: 5,645,197
[45] Date of Patent: Jul. 8, 1997

[54] ADJUSTABLE VOLUME DOSING DISPENSER FOR FISH FOOD

[76] Inventor: Guan-Zhon Chen, No. 13, Lane 430, Section 2, Yuan Lu Road, Yi Min Tsuen, Pu Hsin Hsiang, Chang Hua Hsien, Taiwan

[21] Appl. No.: 672,750

[22] Filed: Jul. 1, 1996

[51] Int. Cl.⁶ ................................................. B65D 88/54
[52] U.S. Cl. ...................... 222/305; 222/336; 222/361
[58] Field of Search ................................. 222/305, 308, 222/336, 361, 449, 453, 456

[56] References Cited

U.S. PATENT DOCUMENTS

| | | | |
|---|---|---|---|
| 1,988,865 | 1/1935 | Campbell | 222/453 X |
| 2,312,180 | 2/1943 | Manly | 222/361 |
| 2,710,118 | 6/1955 | Stoddard | 222/305 |
| 3,666,150 | 5/1972 | Liljeholm | 222/453 |
| 5,386,929 | 2/1995 | Dutt et al. | 222/361 X |

*Primary Examiner*—Gregory L. Huson
*Attorney, Agent, or Firm*—Charles E. Baxley, Esq.

[57] ABSTRACT

A fish feed container includes a plate having an aperture formed in the center. A cover is secured on top of the container and a tube slidably received in the cover. A lid is secured to the tube, and a spring may bias the lid to enclose the aperture of the plate. The lid is caused to be disengaged from the aperture of the plate in order to allow the fish feed to flow into the tube when the tube is depressed inward of the cover. A bolt is threadedly engaged with the lid so as to adjust the inner space of the tube and so as to adjust the quantity of the fish feed received in the tube.

4 Claims, 4 Drawing Sheets

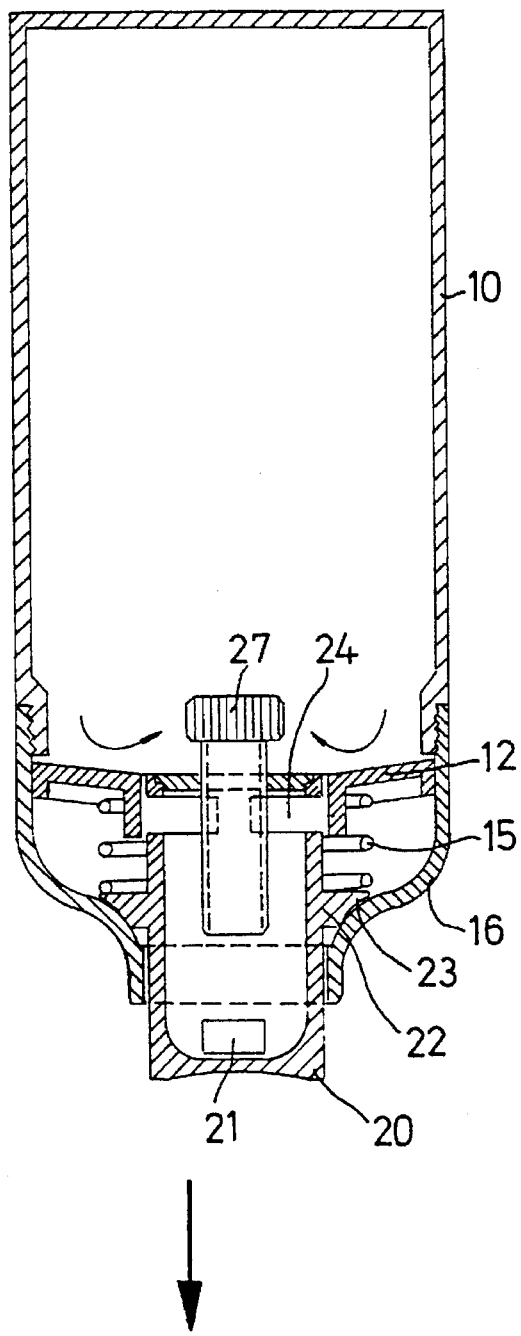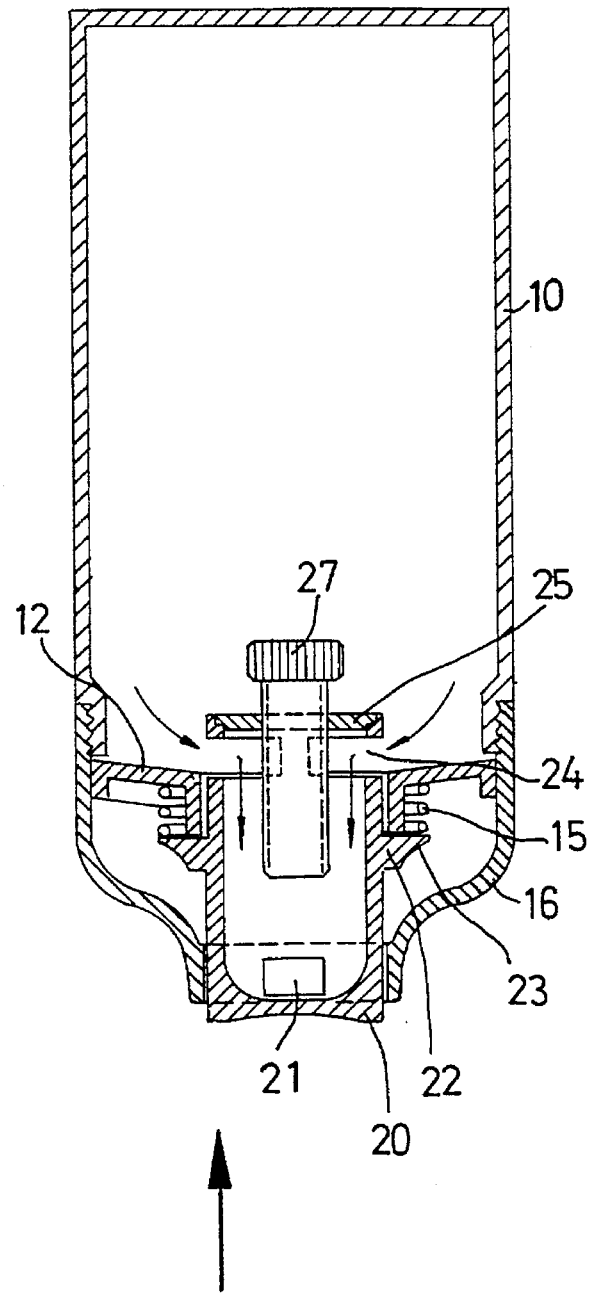

ADJUSTABLE VOLUME DOSING DISPENSER FOR FISH FOOD

BACKGROUND OF THE INVENTION

1. Field of the Invention

The present invention relates to a container, and more particularly to a container for containing fish feed.

2. Description of the Prior Art

Typical fish feed containers comprise a container body having an opening formed in top thereof and comprise a cover rotatably engaged on the container body and having an orifice for aligning with the opening of the container body and for allowing the fish feed to flow out of the container body. However, it is required to rotate the cover relative to the container body carefully so as to accurately align the opening and the orifice with each other and so as to allow the fish feed to flow out of the container body. In addition, the fish feed may flow out of the container body continuously and inadvertently when playing by the children.

The present invention has arisen to mitigate and/or obviate the afore-described disadvantages of the conventional fish feed containers.

SUMMARY OF THE INVENTION

The primary objective of the present invention is to provide a fish feed container in which the fish feed may be controlled to flow out in a predetermined quantity.

The other objective of the present invention is to provide a fish feed container in which the flowing out quantity of the fish feed may be adjusted.

In accordance with one aspect of the invention, there is provided a fish feed container comprising a body for containing fish feed therein, the body including an open upper portion, a plate engaged on top of the body and including an aperture formed therein, a cover secured on top of the body and including an orifice formed therein, a tube slidably engaged in the aperture of the plate and slidably engaged in the orifice of the cover, the tube including an upper portion having an outlet formed therein and including a lower portion having at least one inlet formed therein, a lid secured to the bottom portion of the tube, and means for biasing the lid to enclose the aperture of the plate and for biasing the upper portion of the tube to move outward of the orifice of the cover so as to allow the outlet to be located outward of the cover. The lid is biased to enclose the aperture by the biasing means so as to prevent the fish feed from flowing into the tube, and the lid is caused to be disengaged from the aperture of the plate in order to allow the fish feed to flow into the tube via the inlet when the tube is depressed inward of the cover against the biasing means.

The tube includes an inner space, the lid includes an inner thread formed therein for engaging with a bolt, the bolt is threaded inward and outward of the tube so as to adjust the inner space of the tube and so as to determine the quantity of the fish feed received in the tube.

The tube includes a middle portion having an annular flange formed therein and extended radially outward therefrom for engaging with the plate so as to limit a movement of the tube relative to the cover and the plate.

A cap is further engaged on the cover for enclosing the tube and for preventing the fish feed from flowing out of the cap.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 4 and 5 are cross sectional views illustrating the operation of the fish feed container.

DETAILED DESCRIPTION OF THE PREFERRED EMBODIMENT

Figure 1:
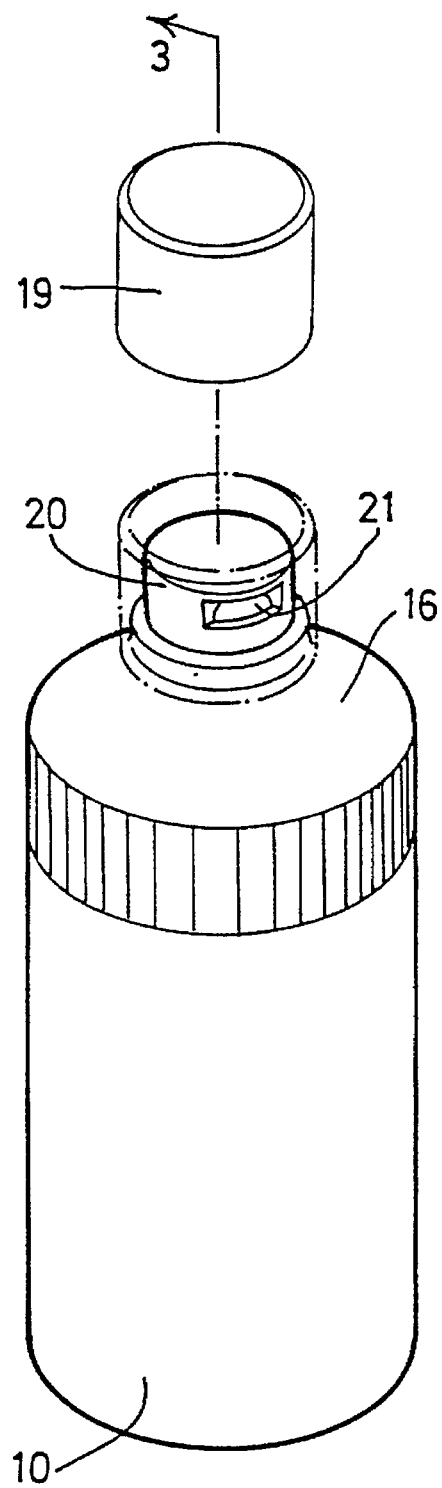
FIG. 1 is a perspective view of a fish feed container in accordance with the present invention.
Figure 2:
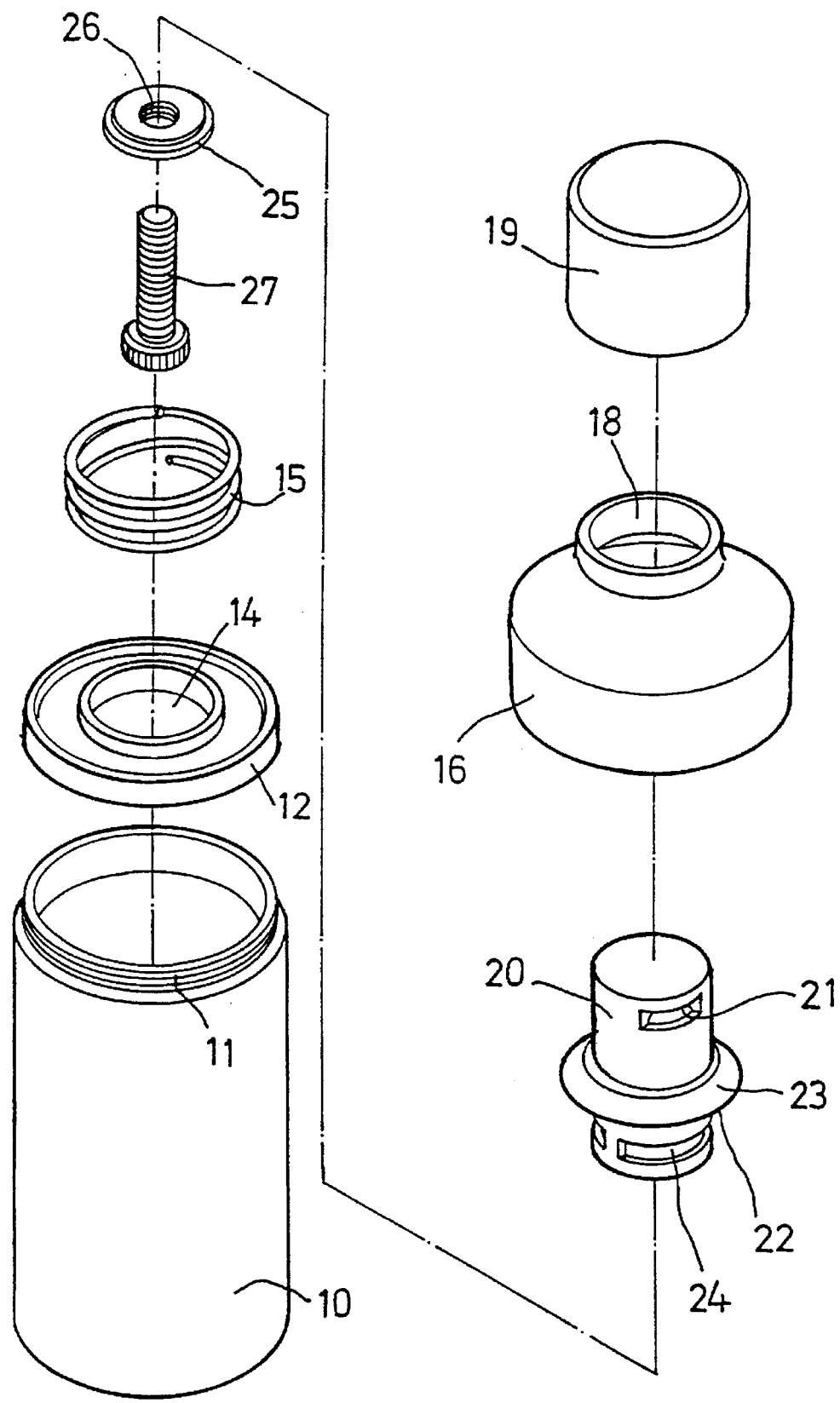
FIG. 2 is an exploded view of the fish feed container.
Figure 3:
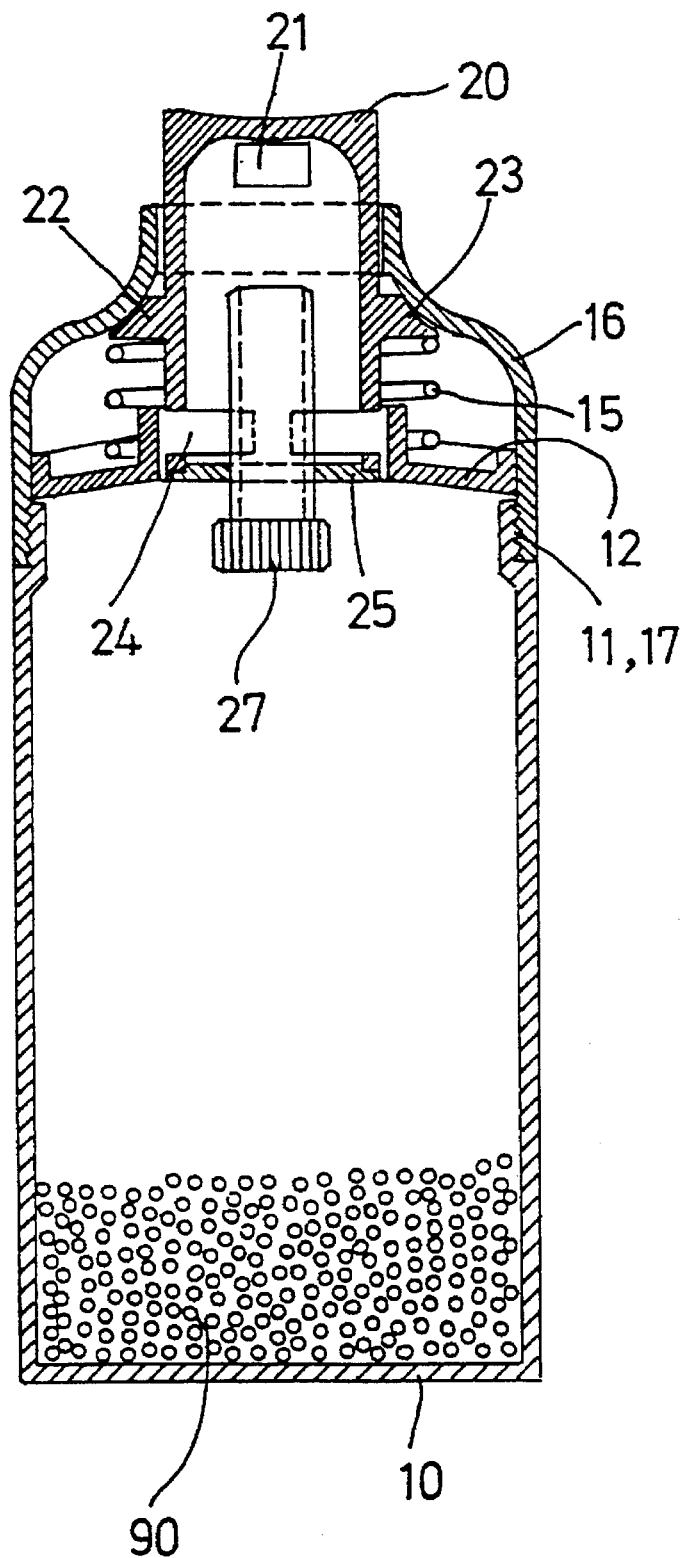
FIG. 3 is a cross sectional view taken along lines 3—3 of FIG. 1.

Referring to the drawings, and initially to FIGS. 1 to 3, a fish feed container in accordance with the present invention comprises a container body 10 for containing fish feed 90 (FIG. 3) therein. The body 10 includes an outer thread 11 formed in the upper peripheral portion thereof. A plate 12 is engaged on top of the body 10 and includes an aperture 14 formed therein. A spring 15 is engaged on the plate 12. A cover 16 includes an inner thread 17 (FIG. 3) for engaging with the outer thread 11 of the body 10 and for securing to the body 10. The cover 16 includes an orifice 18 formed therein.

A tube 20 is slidably engaged in the aperture 14 of the plate 12 and slidably engaged in the orifice 18 of the cover 16, best shown in FIGS. 3–5. The tube 20 includes an outlet 21 formed in the upper portion and includes an annular flange 22 formed in the middle portion and extended radially outward therefrom for engaging with the plate 12 so as to limit the movement of the tube 20 relative to the cover 16 and the plate 12. The annular flange 22 includes a curved upper surface 23 for engaging with the corresponding curved inner peripheral surface of the cover 16 (FIG. 3). The tube 20 includes one or more inlets 24 formed in the lower portion. A lid 25 is secured to the bottom portion of the tube 20 and includes an inner thread 26 formed therein for engaging with a bolt 27. The spring 15 is engaged between the annular flange 22 of the tube 20 and the plate 12 for biasing the upper portion of the tube 20 outward of the orifice 18 of the cover 16 and for biasing the lid 25 to enclose the aperture 14 of the plate 12. A cap 19 is engaged on the cover 16 for enclosing the tube 20 and for preventing the fish feed 90 from flowing out of the cap 19.

In operation, as shown in FIGS. 3 and 4, the lid 25 may be biased to enclose the aperture 14 such that the fish feed 90 may not flow into the tube 20. However, as shown in FIG. 5, when the tube 20 is depressed inward of the cover 16 against the spring 15, the lid 25 is caused to be separated from the plate 12 such that the fish feed 90 may flow into the tube 20 via the inlets 24. At this moment, the outlet 21 is engaged in the cover 16 such that the fish feed may be prevented from flowing out of the tube 20 at this moment. When the tube 20 is released, the lid 25 is biased to engage with the aperture 14 of the plate 12 again. At this moment, the outlet 21 is disengaged from the cover 16 such that the fish feed 90 may flow out of the tube 20 via the outlet 21.

It is to be noted that the bolt 27 may be threaded inward or outward of the tube 20 so as to adjust the inner space of the tube 20 and so as to adjust the quantity of the fish feed that may be received in the tube 20. For example, when the bolt 27 is threaded into the tube 20, the quantity of the fish feed that may be received in the tube 20 is reduced.

Accordingly, the fish feed container in accordance with the present invention includes a tube for receiving a predetermined quantity of fish feed therein and for allowing the predetermined quantity of fish feed to flow out of the tube once at a time. In addition, the quantity of the fish feed received in the tube may be adjusted by the bolt.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A fish feed container comprising:

a body for containing fish feed therein, said body including an open upper portion, a plate engaged on top of said body and including an aperture formed therein, a cover secured on top of said body and including an orifice formed therein, a tube slidably engaged in said aperture of said plate and slidably engaged in said orifice of said cover, said tube including an upper portion having an outlet formed therein and including a lower portion having at least one inlet formed therein, a lid secured to said bottom portion of said tube, and means for biasing said lid to enclose said aperture of said plate and for biasing said upper portion of said tube to move outward of said orifice of said cover so as to allow said outlet to be located outward of said cover, said lid being biased to enclose said aperture of said plate by said biasing means so as to prevent the fish feed from flowing into said tube, and said lid being caused to be disengaged from said aperture of said plate in order to allow the fish feed to flow into said tube via said inlet when said tube is depressed inward of said cover against said biasing means.

2. A fish feed container according to claim 1, wherein said tube includes an inner space, said lid includes an inner thread formed therein for engaging with a bolt, said bolt is threaded inward and outward of said tube so as to adjust said inner space of said tube.

3. A fish feed container according to claim 1, wherein said tube includes a middle portion having an annular flange formed therein and extended radially outward therefrom for engaging with said plate so as to limit a movement of said tube relative to said cover and said plate.

4. A fish feed container according to claim 1 further comprising a cap engaged on said cover for enclosing said tube and for preventing the fish feed from flowing out of said tube.

* * * * *